United States Patent
Grylls et al.

(10) Patent No.: US 6,616,410 B2
(45) Date of Patent: Sep. 9, 2003

(54) OXIDATION RESISTANT AND/OR ABRASION RESISTANT SQUEALER TIP AND METHOD FOR CASTING SAME

(75) Inventors: Richard John Grylls, Albuquerque, NM (US); Joseph David Rigney, Milford, OH (US); Warren Davis Grossklaus, Jr., West Chester, OH (US); Melvin Robert Jackson, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/041,072

(22) Filed: Nov. 1, 2001

(65) Prior Publication Data

US 2003/0082054 A1 May 1, 2003

(51) Int. Cl.[7] ............................................. F01D 5/28
(52) U.S. Cl. ................ 416/224; 416/241 R; 415/173.4; 29/889.2; 228/214; 228/224.1
(58) Field of Search ............................ 416/224, 241 R, 416/241 A; 415/173.4, 115, 116, 173.1, 173.6, 174.4; 29/889, 889.2, 889.21, 889.22, 889.72; 427/142; 228/214, 215, 224.1, 193

(56) References Cited

U.S. PATENT DOCUMENTS

| | | | |
|---|---|---|---|
| 3,908,741 A | 9/1975 | Keizer ........................... 164/80 |
| 3,908,743 A | 9/1975 | Schenk, Jr. et al. ............ 164/80 |
| 4,148,800 A | 4/1979 | Schubart et al. ....... 260/306.7 R |
| 4,867,224 A | 9/1989 | Wakita et al. .................. 164/80 |
| 4,869,645 A | 9/1989 | Verpoort .................. 416/241 R |
| 4,947,924 A | 8/1990 | Morita et al. ................... 164/97 |
| 4,970,125 A | 11/1990 | Janney ........................ 428/579 |
| 5,261,477 A | 11/1993 | Brunet et al. ................... 164/97 |
| 5,261,480 A | 11/1993 | Wortmann et al. ........... 164/256 |
| 5,304,039 A | 4/1994 | Corderman et al. ..... 416/241 R |
| 5,314,003 A | 5/1994 | Mackay ....................... 164/494 |
| 5,350,004 A | 9/1994 | Rocazella et al. ............. 164/97 |
| 5,388,973 A | 2/1995 | Richardson, Jr. ........... 418/55.2 |
| 5,448,929 A | 9/1995 | Sundstrom .................... 76/112 |
| 5,568,833 A | 10/1996 | Fraisier ....................... 164/128 |
| 5,603,603 A | 2/1997 | Benoit et al. ............. 415/173.4 |
| 5,673,744 A | 10/1997 | Bewlay et al. ................ 164/80 |
| 5,694,683 A | 12/1997 | Teets et al. ............. 29/889.721 |
| 5,732,467 A | 3/1998 | White et al. ............... 29/889.1 |
| 5,740,668 A | 4/1998 | Fujiwara ..................... 60/39.75 |
| 5,778,960 A | 7/1998 | Jackson et al. ............... 164/98 |
| 6,468,040 B1 * | 10/2002 | Grylls et al. ................. 416/224 |
| 6,502,304 B2 * | 1/2003 | Rigney et al. ........... 29/889.21 |

* cited by examiner

Primary Examiner—Edward K. Look
Assistant Examiner—J. M. McAleenan
(74) Attorney, Agent, or Firm—Carmen Santa Maria; Kurt L. Ehresman; McNees Wallace & Nurick LLC

(57) ABSTRACT

The present invention provides for a squealer tip to include some proportion of a highly oxidation-resistant material, and a method for casting same, such that if any environmental coating were removed, the tip would retain some increased level of environmental resistance. The oxidation-resistant material optionally may also be a high abrasion resistance material, such that recession of the tip due to rubbing against a stator would be reduced. In a preferred embodiment, an abrasion-resistant and/or oxidation-resistant material is placed and suitably anchored into the tip region of a wax precursor used to cast a turbine airfoil. During the casting operation, the abrasion-resistant and/or oxidation-resistant material is not completely melted. As the alloy used to form the majority of the turbine blade solidifies, the abrasion and/or oxidation resistant material is incorporated into the turbine airfoil by the solidification of the alloy around it.

29 Claims, 3 Drawing Sheets

OXIDATION RESISTANT AND/OR ABRASION RESISTANT SQUEALER TIP AND METHOD FOR CASTING SAME

FIELD OF THE INVENTION

The present invention relates generally to turbine airfoil components in gas turbine engines and particularly to increased oxidation resistance and/or abrasion resistance in squealer tips.

BACKGROUND OF THE INVENTION

In an aircraft gas turbine (jet) engine, air is drawn into the front of the engine, compressed by a shaft-mounted compressor, and mixed with fuel. The mixture is burned, and the hot exhaust gases are passed through a turbine, typically mounted or connected to the same shaft. The flow of gas through the rotating portion of the turbine comprising turbine blades turns the turbine, which turns the shaft and provides power to the compressor. The hot exhaust gases flow from the back of the engine driving it forward. The hot exhaust gases flow past the turbine blades causing the blades to turn which in turn causes the shaft to turn and the engine to operate. However, some of the gases flow around the tips of the rotating blades, escaping from the engine between a static seal structure that encases the blades and the blade tips. The flow of gases through the gap between the seal structure and the blade tips decreases the efficiency of the engine. This gap can be caused by one or more of a variety of different factors. Thus, in order in increase the efficiency of the engine, it is desirable to eliminate or minimize the gap between the blade tip and the static seal.

The seal portions of a turbine that encase turbine blade tips generally consist of two principal elements, rotating turbine tips and a non-rotating, stationary seal on the stator. Rotating turbine tips extend radially outward from turbine blades toward the static seal and frequently have rows of thin tooth-like projections, commonly referred to as squealer tips. The static seal or stator is normally comprised of a mating metallic surface which may be a thin (filled or unfilled) honeycomb ribbon configuration or a solid surface such as a shroud with or without flow path cooling. These principal elements are generally situated circumferentially about the axial (lengthwise) dimension of the engine and are positioned with a small radial gap therebetween to permit assembly of the rotating turbine blades and static components.

The effectiveness of the turbine engine varies directly with the proportion of gas that impinges upon the turbine. One factor is fit-up of the blade tips to the seal. Closer tolerances between the rotating and static seals assists in achieving greater efficiencies. However, the fabrication process to obtain these close tolerances is extremely costly and time-consuming.

When the gas turbine engine is operated, the rotating seal can expand radially more than the stator, causing the squealer tip to rub into the stator seal, creating frictional contact between the squealer tip and the stator. This frictional contact in conjunction with the elevated operating engine temperature causes the squealer tip temperatures well in excess of 2,000 degrees F. with resulting possible damage to one or both seal members. The rub itself causes material typically to be removed from the squealer tip region of the blade. Such materials include the outermost portions of the blade which invariably include at least some or all of the protective environmental coatings that are usually applied to blades. As a result of the contact and the resultant high temperatures, squealer tips may crack, oxidize and recede, significantly impairing the seal efficiency and operation of the engine.

The shroud or seal construction is used to reduce the surface area on which the squealer tip rubs and helps to minimize the heat transferred into the rotating seal. In addition, blade tips and in particular squealer tips are made thin. However, excessive wear from deep rubs into a static seal, whether a solid shroud or filled honeycomb, can damage the rotating squealer tips, negatively affecting durability and engine efficiency. Furthermore, material transfer or removal can occur which also degrades the seal characteristics.

These temperature extremes, particularly those found in the gas path environment, or hot sections of the engine, contribute to the degradation of components, i.e. squealer tips, by the oxidizing and corrosive environments. Environmental coatings and thermal barrier coating (TBC) systems are often applied to the external surfaces of these components to protect the bare alloy from this hot environment. TBC systems also afford the opportunity to improve the efficiency of the engine by increasing operating temperatures. The oxidation-resistant coating systems are generally comprised of a metallic environmental coating (bond coat) applied to the structural component, and, in the case of TBC systems, an insulating ceramic layer applied on top of the bond coat.

Rubbing of the blade tip against the seal causes the removal of the insulating ceramic layer, if present, and the environmental coating from the tip region of the blades, allowing direct exposure of the less oxidation resistant substrate alloy to hot oxidizing gases. A consequence of this is more rapid oxidation of the squealer tip causing tip recession and cracking. The resulting increase in the clearance between the blade tips and shroud causes significant loss in engine efficiency and increase in engine operating temperatures as the gas temperatures are raised to achieve equivalent thrust, further exacerbating the problem.

Various coating techniques have been applied to the substrate metal in an attempt to increase both service life and operating efficiencies. For example, U.S. Pat. No. 5,603,603 to Benoit et al. is directed to applying by electrodeposition an abrasive tip coating to the blade tips, while U.S. Pat. No. 4,884,820 to Jackson et al. is directed to bonding a ceramic or metallic coating to the blade tips.

Industries other than the jet aircraft industry have also attempted to increase heat and abrasion resistance. For example, U.S. Pat. No. 4,060,250 to Davis et al. is directed to non-aircraft centrifugal compressors, in which the carbon steel rotary elements are inlaid or coated with a corrosion and heat resistant alloy, such as a chromium-containing nickel-based alloy. The surface of the rotatable cylindrical member is characterized by this metallurgically bonded fused alloy coating.

Other attempts include a metal-ceramic composite for use in a heating furnace disclosed in U.S. Pat. No. 4,947,924 to Morita et al. and an infiltration technique to improve the abrasion ability of the surface of a cutting tool such as a grinder by using a binder metal in a layer filled with grains of tungsten carbide, disclosed in U.S. Pat. No. 5,261,477 to Brunet et al.

Thus, there is a continuous need for improved designs for rotating turbine blade squealer tips to increase both service life and engine operating efficiencies. In particular, there remains a need to extend the service life of the squealer tip following the unavoidable loss of some or all of the squealer tip environmental coating. The present invention fulfills this need, and further provides related advantages.

SUMMARY OF THE INVENTION

The present invention provides for a squealer tip to include some proportion of a highly oxidation-resistant material, and a method for casting same, such that if any environmental coating were removed, the tip would retain some increased level of environmental resistance. The oxidation-resistant material optionally may also be a high abrasion resistance material, such that recession of the tip due to rubbing against a static seal would be reduced. The present invention also includes the squealer tip produced by the foregoing method.

An abrasion-resistant and/or oxidation-resistant material is placed and suitably anchored into the tip region of a wax precursor of a turbine airfoil mold prior to casting. Before casting and after coating the wax with a material that can withstand high temperatures to form a wax preform, the wax perform is enclosed within a mold, and wax is removed and drained during a low temperature heating cycle, leaving the oxidation-resistant material anchored at the tip region. During the casting operation, the abrasion-resistant and/or oxidation-resistant material that remains at the tip region is not completely melted, but remains anchored in the tip of the region even as the molten metal of the substrate alloy flows around the tip. As the alloy used to form the majority of the turbine blade solidifies, the abrasion and/or oxidation resistant material is incorporated into the turbine airfoil structure by the solidification of the alloy around it.

One advantage of the present invention is improved airfoil squealer tip performance and decreased squealer tip recession. Because the quality of the seal directly impacts engine efficiency, less recession results in less resultant decrease in sealing capability and hence, greater engine performance. The abrasion resistant alloy will survive the rubs against the adjacent static seal with less damage to the tip and less wear.

Another advantage is the improved temperature capability of high pressure turbine (HPT) airfoil tips, enabling higher T4.1 temperatures (first stage turbine-located immediately aft of the combustor) in the hottest engines, with resultant increase in engine efficiencies.

Yet another advantage is that existing investment casting operations can be easily modified to utilize the method of the present invention.

Other features and advantages of the present invention will be apparent from the following more detailed description of the preferred embodiment, taken in conjunction with the accompanying figures which illustrate, by way of example, the principles of the invention.

DETAILED DESCRIPTION OF THE INVENTION

Figure 1:
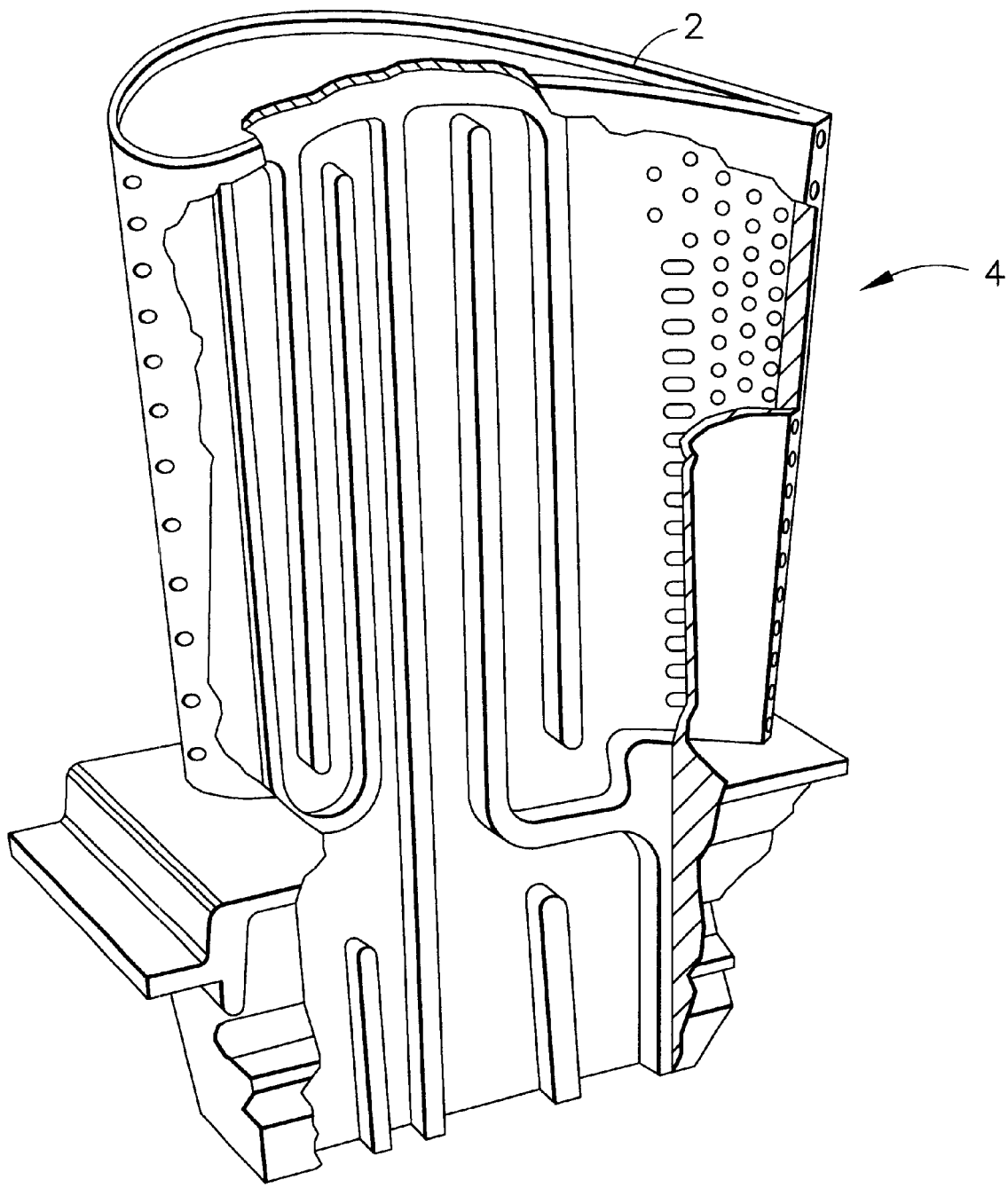
FIG. 1 is a representation of a jet turbine engine turbine blade showing the squealer tip region.

While the method of this invention is particularly adapted to producing the squealer tip 2 of an airfoil 4 shown in FIG. 1 having improved oxidation-resistance and/or abrasion resistance, other structures may be prepared using this method, if desired.

Alloys often used in turbine parts or airfoils for aircraft engines and power generation equipment may include nickel, cobalt, or iron based superalloys. Examples of such substrates are GTD-111, GTD-222, René 80, René 41, René 125, René 77, René N5, René N6, PWA 1484, PWA 1480, $4^{th}$ generation single crystal superalloy, MX-4, Hastelloy X, cobalt-based HS-188, and similar alloys. While these materials have excellent strength at high temperatures, they still must be protected against the extreme temperatures and corrosive environments experienced in the gas turbine environment. Thermal barrier coating systems frequently have been applied over these materials to provide the improved thermal capability, and an intermediate material that both improves adhesion and provides environmental protection is typically applied over these substrate materials as a bond coat/environmental coat, as previously discussed.

Figure 2:
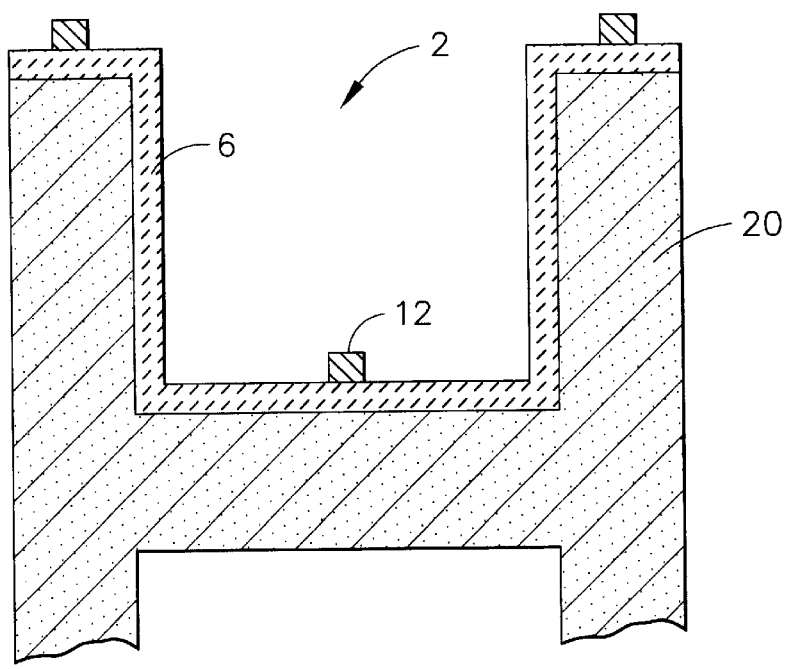
FIG. 2 is a cross sectional representation of a squealer tip wax precursor with a monolithic material insert.
Figure 3:
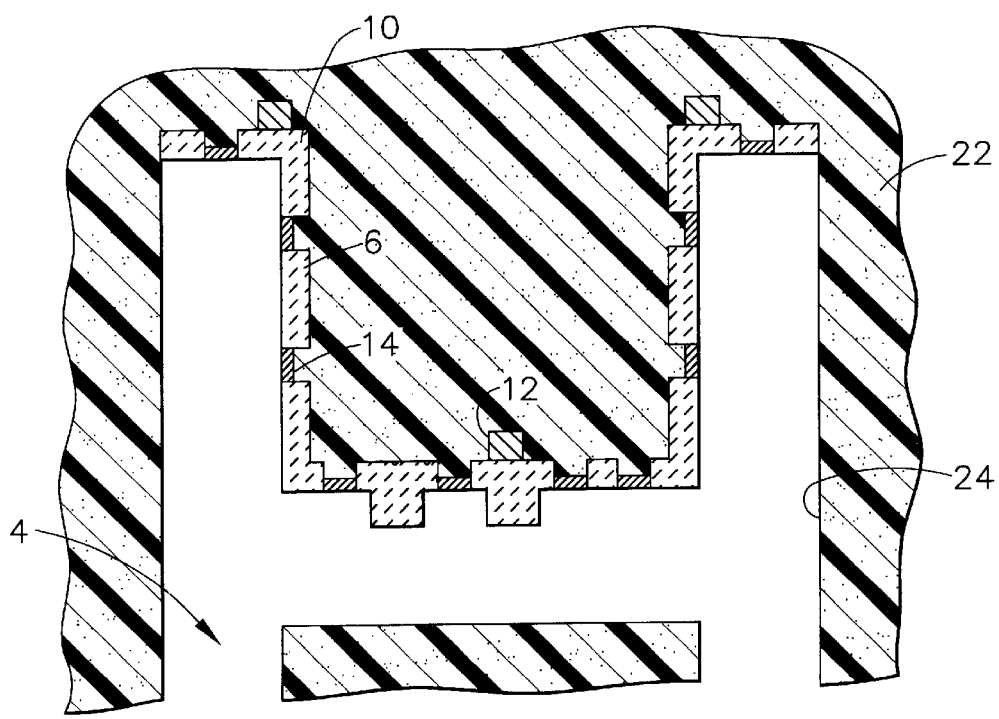
FIG. 3 is a cross sectional representation of a squealer tip wax precursor void in an investment mold with a material insert comprised of a plurality of small pieces.
Figure 4:
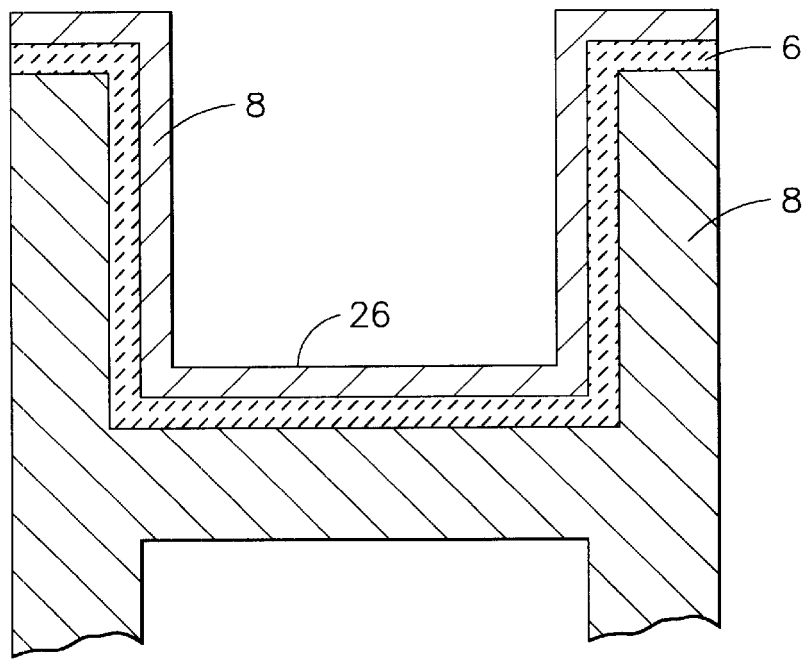
FIG. 4 is a cross sectional representation of a squealer tip with material below the tip surface.

These substrate alloys are cast into predetermined turbine parts or airfoil shapes using casting techniques well known in the art, for example, an investment "lost wax" technique. Referring to FIGS. 2, 3 and 4, an investment lost wax technique generally involves fabricating a wax precursor 20 in a predetermined shape; encasing the wax precursor 20 in an investment material 22; removing the wax precursor 20 leaving a void 24 within the investment material 22 in the form of the predetermined shape; casting molten alloy into the investment void 24 and allowing the alloy to solidify; and removing the investment 22, thereby leaving cast alloy 8 in the predetermined shape.

As shown in FIG. 2, in a preferred embodiment, the method of this invention is performed by placing an abrasion-resistance and/or oxidation-resistant material 6 ("material") into a predetermined tip region 2 of the wax precursor 20. The material is anchored to wax precursor by 20, for example, the inherent adhesive nature of the wax, or by mechanical locks, for example pores, depressions and/or projections, fabricated into the surfaces of material 6. Examples of such materials 6 include ceramics, for example, strain-tolerant ceramics, such as zirconia, alumina and yttria-alumina, and elements such as, for example, Ru, Rh, Pd, Os, Ir, Pt, or an alloy thereof. Ideally, the material 6 possesses environmental resistance superior to that of the alloy 8 constituting the casting substrate, and/or the material possesses abrasion resistance superior to that of the alloy 8 constituting the casting substrate.

The material 6 should have a higher melting point than the substrate alloy 8, and should not completely dissolve in the molten alloy during the casting and solidification process. The material 6 may be monolithic, or it may be present in a plurality of interconnected pieces 10 to provide improved strain tolerance as shown in FIG. 3 after the precursor wax has been removed and the substrate alloy has been cast into the remaining cavity. The monolithic material 6 or its configuration as components having smaller pieces 10 should possess sufficient strain tolerance such that it will not be broken during the casting process. The plurality of smaller pieces 10 may, for example, be in the shape of plates, fibers, particles, rods or spheres. The material 6 may be made up of a single component material or it may be made up of two component materials, one component of pieces providing environmental resistance and/or abrasion resistance, for example, a ceramic, and the other component, a linking component, holding together the pieces of the ceramic material, for example, metal alloy, in order to provide improved strain tolerance. The material 6 as a single component material or as a two component material of pieces 10 may be porous, nonporous or a combination of the two. When the material is alumina or another material that may be affected by the leaching solutions used to remove core materials, care must be taken to protect material 6.

The overall shape of material 6 as a single component or as a first component of a plurality of small pieces 10 held together by a second component may be of any predetermined shape suitable for placement within the predetermined region of the component, such as the tip region 2 of the airfoil 4, for example, a turbine blade. To maintain the relative position of the material 6 within the investment void 24 after removal of the wax precursor 20 and prior to alloy casting, the material 6 must be suitably anchored to the investment material 22. Likewise, when a plurality of small pieces 10 are utilized, in order to maintain their relative position, the plurality of small pieces 10 must be suitably anchored one to another as well as to the investment 22 so that they will not be displaced by the turbulent flow of the molten metal as it enters the mold cavity.

When monolithic material is utilized, at least one extension, for example, a tab or "ear" 12 is fabricated to extend beyond the wax precursor 20 so as to engage and become anchored in the investment material 22. Following casting and removal of the investment material 22, these tabs or ears 12 are removed by any suitable method, such as, for example, grinding or laser drilling. Other anchoring techniques, such as pinning material 6 with a metal component that will melt during the casting operation can also be used.

When a plurality of small pieces 10 are utilized, shown in FIG. 3, the pieces are held in the predetermined shape by connectors 14, for example, rods, manufactured of materials, such as those described above, that will not completely melt or dissolve during the casting process. Alternatively, connectors 14 may melt forming part of the molten metal which then replaces the connectors. It should be appreciated that in FIG. 3, the space between pieces 10, hence the length of the connectors 14, are not drawn to scale for clarity. In practice, the connector 14 length is a predetermined minimum length sufficient to provide the predetermined amount of strain relief. Additionally, at least one extension 12, for example, a tab or ear extends from at least one small piece 10 beyond the wax precursor 20 so as to engage and become anchored in the investment material 22. Following casting and removal of the investment material 22, these tabs or ears 12 are removed by any suitable method, such as, for example, grinding or laser drilling. Optionally, the predetermined shape of the material 6 may be designed to extend downward below the tip cap region 2 into the main body of the airfoil 4 to provide enhanced mechanical anchoring of the material 6 within the alloy 8. The anchoring can be improved by configuring the anchor in the shape of a dovetail. The distance that the anchoring extends below the surface will vary depending upon the joint shape and upon the strength of the bond required between the substrate alloy and material 6 required at or in the vicinity of the surface. The method of anchoring the material can be any suitable method of maintaining the material in position, and it may include both anchoring means that melt, such as the pins previously discussed or anchoring pins that do not melt.

The material 6 may be positioned within the wax precursor 20 so that following casting of the substrate alloy, the material 6 is exposed at the surface 26 of the blade 4 during normal operation, or the material 6 may be positioned within the wax precursor 20 so that following casting it is completely covered by alloy 8 during normal operation, but exposed if the alloy 8 is oxidized away or otherwise removed during engine operation, as shown in FIG. 4.

During the casting process, because the material 6 does not completely melt or dissolve within the molten substrate alloy, the material 6 is incorporated into the turbine airfoil 4 by the solidification of the substrate alloy 8 around or adjacent to it. Following subsequent machining and coating operations, the material 6 remains essentially undisturbed in the tip region 2. Optionally, the material 6 is chosen to partially melt or dissolve during the casting and solidification process, thereby producing a gradient of composition in the tip region 2.

When porous material is utilized, molten alloy can infiltrate into the pores during casting, creating a fine mechanical interlock between the material and the alloy. Optionally, the pores of the porous material may be completely filled with a metal, for example, aluminum or an aluminum alloy, which is dissolved into the alloy during casting, but which solidifies to provide a tip having a higher concentration of the metal, such as aluminum, thereby providing a tip having, for example in the case of aluminum, improved oxidation resistance.

Figure 5:
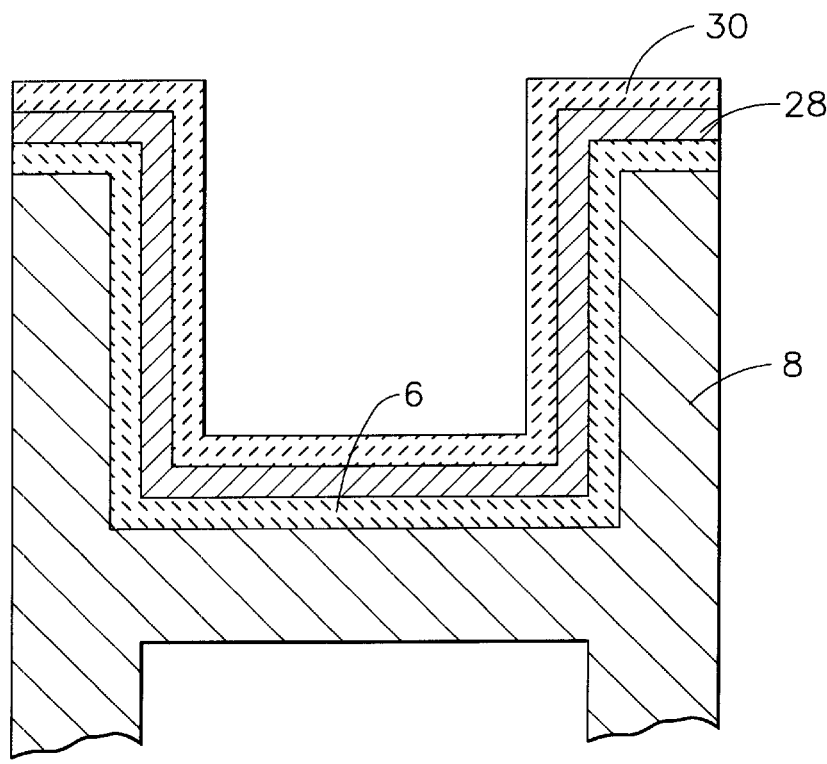
FIG. 5 is a cross sectional representation of a squealer tip, material and a TBC.

Shown in FIG. 3, following casting and removal of the investment 22, the casting may be machined to remove the tabs, ears or other extensions 12, or otherwise machined to achieve a final predetermined shape. Optionally, environmental coatings such as a bond coat 28 or thermal barrier coating system (TBC) that includes a bond coat 28 with a ceramic top coat 30 may be applied using known methods and materials, as shown in FIG. 5.

In an embodiment in which pieces 10 of the oxidation resistant material/abrasion resistant material 6 are attached to the surface of the substrate alloy, but portions of the pieces project above the substrate alloy, environmental coatings and thermal barrier coatings can still be applied over the substrate alloy in the conventional manner to provide environmental and thermal protection to that portion of the substrate between the pieces. In operation, as the squealer tip contacts the stator, the initial rub may remove that portion of the environmental and thermal barrier coating above material 6, but those portions of the environmental and thermal barrier coatings overlying the substrate alloy but on a plane with or below the plane of pieces 10 will not be affected by contact with the stator, as the pieces 10 will wear away the stator to a compliant configuration, leaving a squealer tip having environmental and thermal protection.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A squealer tip for a turbine airfoil component used in a gas turbine engine formed by casting, the tip comprising:
   an oxidation resistant first material of predetermined shape fixedly held in a predetermined position in a casting mold;
   a substrate alloy adjacent the oxidation resistant first material, wherein during casting, the substrate alloy, in cooling from a molten state, flows into contact with and solidifies in contact with the first material without causing disintegration of the first material.

2. The squealer tip of claim 1 wherein the first material is abrasion resistant.

3. The squealer tip of claim 1 wherein the first material is selected from the group consisting of Ru, Rh, Pd, Os, Ir, Pt, and alloys thereof.

4. The squealer tip of claim 1 wherein the first material is a strain-tolerant ceramic.

5. The squealer tip of claim 4 wherein the strain-tolerant ceramic is selected from the group consisting of zirconia, alumina, yttria-alumina alloy.

6. The squealer tip of claim 1 wherein the first material is fixedly held in the predetermined position in the casting mold by a wax precursor prior to casting.

7. The squealer tip of claim 1 wherein the first material includes at least one extension embedded in an investment material prior to casting.

8. The squealer tip of claim 1 wherein the first material is porous.

9. The squealer tip of claim 8 wherein pores of the first material are filled with a second material having a melting point below the melting point of the substrate alloy, the second material dissolving into the alloy upon casting.

10. The squealer tip of claim 1 wherein the predetermined shape of the first material is such that the first material extends into a main body of the airfoil a predetermined distance sufficient to anchor the first material into a surface of the alloy substrate after casting and solidification.

11. The squealer tip of claim 1 wherein the first material is monolithic.

12. The squealer tip of claim 1 wherein the first material comprises at least two components, the first component being a plurality of pieces fixedly connected by a second component extending between the plurality of pieces.

13. The squealer tip of claim 12 wherein the second component extending between and fixedly connected to the plurality of pieces is selected from a group of forms consisting of plates, fibers, particles, rods, spheres and combinations thereof.

14. The squealer tip of claim 13 wherein the second component extending between and connecting the plurality of pieces is second material that provide a predetermined strain tolerance.

15. The squealer tip of claim 1 wherein the first material is positioned such that at least a portion of the first material is exposed at a surface of the component.

16. The squealer tip of claim 1 wherein the first material is completely covered by the alloy.

17. The squealer tip of claim 1 wherein a gradient of first material is formed at a surface of the substrate alloy, the amount of first material being greatest at the surface and decreasing with increasing distance from the surface.

18. The squealer tip of claim 1 wherein the first material is more environmentally resistant than the alloy substrate material at elevated temperatures in the exhaust of a gas turbine engine.

19. The squealer tip of claim 1 wherein the first material is more abrasion resistant than the alloy substrate material.

20. The squealer tip of claim 1 further comprising an environmental coating adhered to an exposed surface of the squealer tip.

21. The squealer tip of claim 20 further including a thermal barrier coating adhered to the environmental coating.

22. A method for casting an oxidation resistant squealer tip for a turbine airfoil component used in a gas turbine engine comprising the steps of:

fabricating a wax precursor in a first predetermined shape;

anchoring an oxidation resistant first material of a second predetermined shape to the wax precursor at a predetermined position;

encasing the first material and the wax precursor in an investment material such that the investment material engages the first material and fixedly anchors the first material;

removing the wax precursor leaving the first material fixedly anchored within an investment mold in the predetermined position;

casting a substrate alloy into the investment mold without completely dissolving or breaking the first material;

solidifying the substrate alloy around the first material fixedly anchored in the first predetermined position at the squealer tip; and, removing the investment mold.

23. The method of claim 22 wherein the first material is abrasion resistant.

24. The method of claim 22 further comprising the step of adhering an environmental coating to an exposed surface of the squealer tip.

25. The method of claim 24 further comprising the step of removing the at least one extension following removal of the investment material.

26. The method of claim 24 wherein the first material is monolithic.

27. The method of claim 22 wherein the first material includes at least one extension to anchor the first material to the investment material.

28. The method of claim 22 wherein the first material is a plurality of pieces fixedly attached to one another.

29. The cast oxidation and abrasion resistant squealer tip for a turbine airfoil component used in a gas turbine engine produced by the method of claim 22.

* * * * *